July 29, 1924.

A. JEŽEK

AUTOMOBILE BUMPER

Filed March 27, 1924

1,503,049

Inventor
A. Ježek
By
F. K. Bryant
Attorney

Patented July 29, 1924.

1,503,049

UNITED STATES PATENT OFFICE.

ANTON JEŽEK, OF HOPKINS, MINNESOTA.

AUTOMOBILE BUMPER.

Application filed March 27, 1924. Serial No. 702,336.

*To all whom it may concern:*

Be it known that I, ANTON JEŽEK, a citizen of Czechoslovakia, residing at Hopkins, in the county of Hennepin and State of Minnesota, have invented certain new and useful Improvements in Automobile Bumpers, of which the following is a specification.

This invention relates to certain new and useful improvements in automobile bumpers and has for its primary object to provide a bumper of the spring or resilient type adapted for compression should a collision occur and tend to absorb shocks incident to a collision and fully protect the automobile equipped with the same.

A further object of the invention is to provide a bumper of the above type wherein spring enclosing telescopic cylinders carried by spaced bumper bars have flexible cord or cable connections between the bars for limiting the expansion force of the spring.

With the above and other objects in view that will become apparent as the nature of the invention is better understood, the same consists of the novel form, combination and arrangement of parts hereinafter more fully described, shown in the accompanying drawing and claimed.

Figure 1:
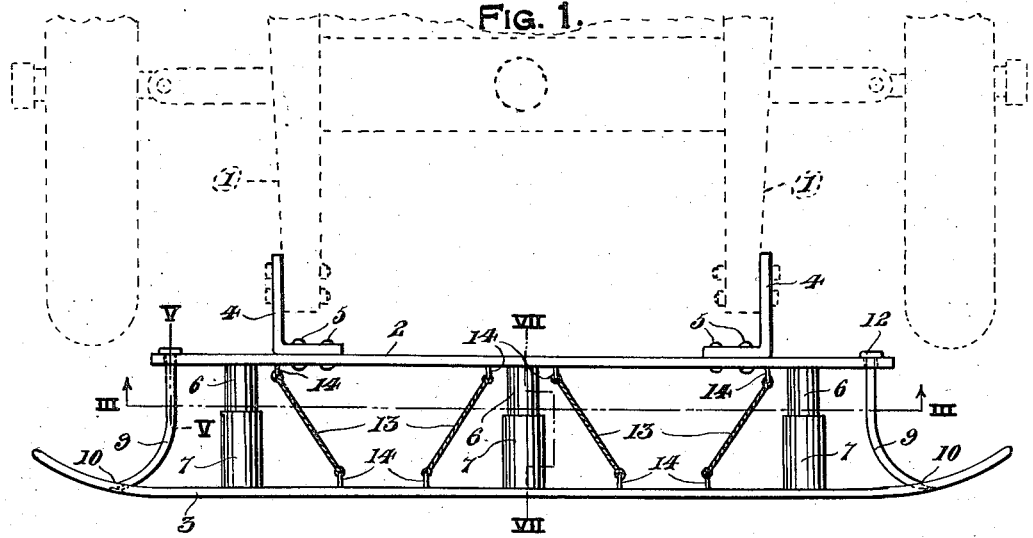

In the drawing, wherein like reference characters designate corresponding parts throughout the several views, Figure 1 is a top plan view of a bumper constructed in accordance with the present invention, a portion of an automobile being illustrated by dotted lines.

Figure 2:
Figure 3:
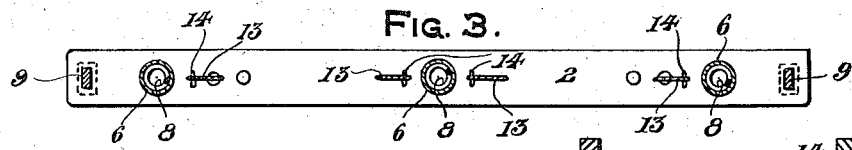
Figure 6:
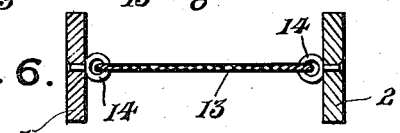
Figure 4:
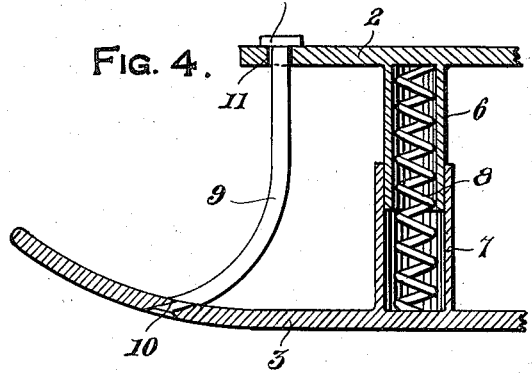
Figure 7:
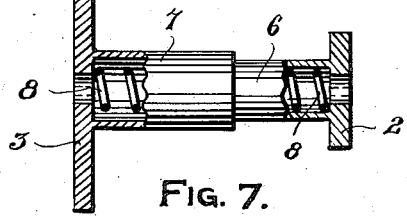
Figure 5:
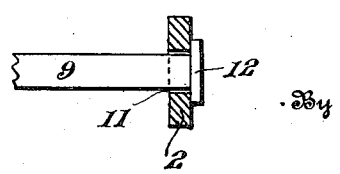

Figure 2 is a front elevational view of the bumper,

Figure 3 is a vertical longitudinal sectional view taken on line III—III of Fig. 1, Figure 4 is a detail sectional view taken on line IV—IV of Fig. 2 showing the spring enclosing tubular telescopic members carried by the bumper bars and the end connecting rod for the bumper bars, Figure 5 is a detail sectional view taken on line V—V of Fig. 1, Figure 6 is a detail sectional view showing the cable connection between the bumper bars, and Figure 7 is a detail sectional view taken on line VII—VII of Fig. 1.

The spring bumper is associated with the forward ends of the side frame bars 1 of the automobile that are illustrated by dotted lines in Fig. 1, the bumper including a rear bar 2 and a forward bumper bar 3 connected together by spring devices, the mounting of the bumper frame upon the frame bars 1 of the automobile including angle brackets 4 secured to the frame bars 1 and further secured as at 5 to the rear bar 2 of the bumper frame.

The rear bar 2 carries a series of forwardly projecting tubular members 6 while the forward bumper bar 3 carries rearwardly directed tubular members 7 that telescopically receive the tubular members 6 as clearly illustrated. Coil springs 8 are enclosed by the telescoping tubular members 6 and 7 as shown in Figs. 4 and 7 for normally holding the forward bumper bar 3 at its limit of forward movement.

The connection between the rear bar 2 and said forward bumper bar 3 includes curved rods 9 anchored as at 10 to the forward bumper bar 3 with the rear ends thereof freely passing through openings 11 formed in the opposite ends of the rear bar 2 and carrying enlarged heads 12 rearwardly of said rear bar 2 as shown in Figs. 1 and 4 and 5. Other devices for limiting the separating movement of the bumper bars 2 and 3 include cord or cable sections 13 anchored at their opposite ends as at 14 to the bars 2 and 3 as shown in Figs. 1 and 6.

From the description of the device, it is believed that the construction and operation thereof will at once be apparent, it being noted that the springs 8 enclosed in the telescopic members 6 and 7 normally tend to separate the bumper bars 2 and 3 with the heads 12 upon the curved rods 9 engaging the rear face of the rear bumper bar 2 while the cables 13 further limit the separating movement of the bumper bars. When the forward bumper bar contacts an abutment, the same moves toward the rear bar 2 causing the tubular members 6 to be telescoped within the tubular members 7 and compressing the springs 8, the rear straight ends of the curved rods 9 freely passing through the openings in the rear bar 2 while the springs 8 absorb all shocks incident to a collision or the like.

While there is herein shown and described the preferred embodiment of the present invention, it is nevertheless to be understood that minor changes may be made therein without departing from the spirit and scope of the invention as claimed.

What is claimed as new is:—

In a bumper for automobiles, a rear and a forward bumper bar, telescoping tubular members respectively carried by the bars, springs enclosed in the tubular members, means for limiting the separating movement of said bumper bars, said means including flexible cables attached at their opposite ends to the bumper bars, and curved rods anchored at their outer ends to the forward bumper bar and slidably associated with the rear bumper bar.

In testimony whereof I affix my signature.

ANTON JEŽEK.